April 5, 1932. W. L. PAUL 1,852,537
DRAFT ATTACHMENT
Filed Nov. 23, 1928
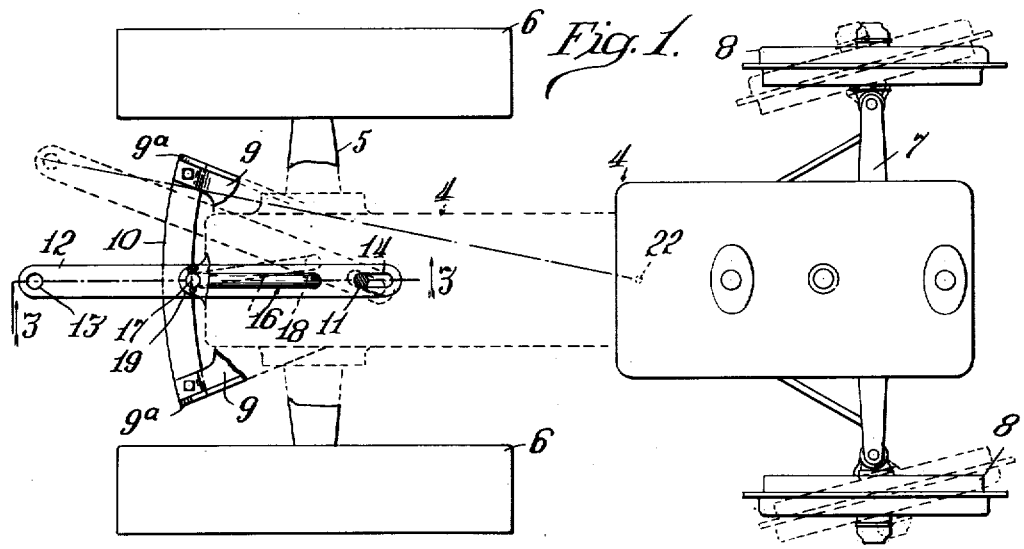
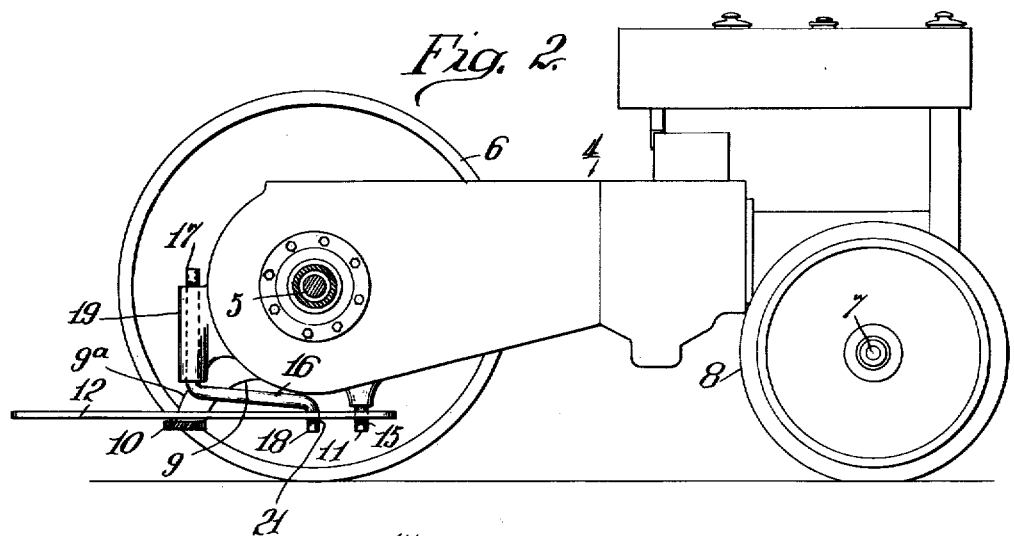
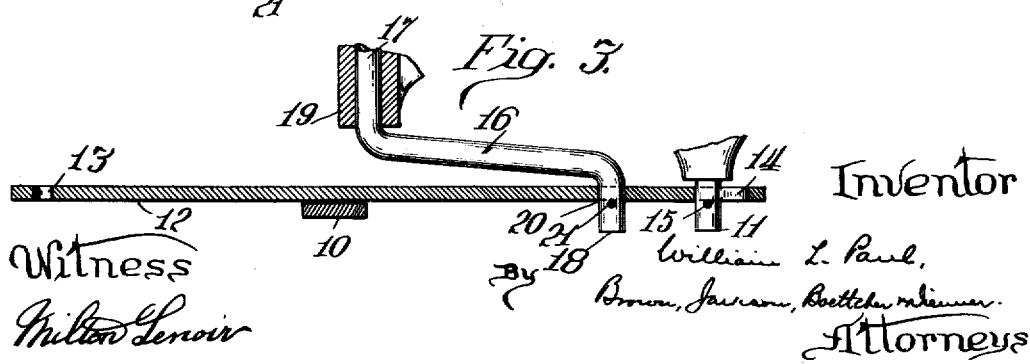
Inventor
William L. Paul, Patented Apr. 5, 1932

1,852,537

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DRAFT ATTACHMENT

Application filed November 23, 1928. Serial No. 321,348.

This invention relates to draft attachments for tractors, of the general type shown and described in my pending application, Serial No. 136,436, filed September 20, 1926, having for their object the connection of a tractor, or other pulling vehicle, with a load, such as a farm implement, to be pulled thereby, in such manner that the tractor may be steered and maneuvered under load with maximum ease and certainty, and particularly around short turns. The difficulties ordinarily encountered in steering a tractor exerting a heavy draw bar pull around a short turn, arise primarily from the particular location of the point of hitch between the draft attachment and the tractor. With the ordinary draft attachment the hitch point of the load is generally back of the axis of the rear wheels of the tractor, and in such location the line of draft is such that the resistance of the load tends to resist lateral turning of the front end of the tractor when it is being steered through a sharp turn.

The result is that the front end of the tractor must "fight" its way around the turn, imposing heavy stresses on the steering wheels and steering linkage, and in many instances causing the front steering wheels to slip laterally or skid over the surface of the ground, even when equipped with the customary side flanges to prevent such side slipping. These difficulties can be avoided by locating the point of hitch forwardly of the axis of the rear wheels, and if the point of hitch be disposed in close proximity to the axis of the front wheels the resistance of the load will actually tend to steer the tractor in any direction in which it may be turned. For most purposes, however, it is desirable that the point of hitch be located at an intermediate point with respect to the axes of the front and rear wheels, where the draft load is approximately balanced as to its tendency to steer, and to resist steering, of the tractor.

Notwithstanding the advantages of locating the point of hitch forward of the rear wheels of the tractor, it has been customary among tractor manufacturers to employ a hitch connection in the form of a draw bar pivotally connected with the tractor at a point back of the rear wheels because, for practical reasons, it is difficult or objectionable to extend the draw bar to a point further forward. Generally, the tractor frame, or corresponding part of the tractor assembly, is not designed to carry the draft load at such a forwardly located hitch point.

Furthermore, a draw bar of the length necessary to permit it to be extended to such a forward hitch point is objectionable because of its interference with the rear wheels on sharp turns, the presence of obstacles in the way of the free lateral swinging of such an extended draw bar, and the susceptibility of a long draw bar to distortion, as by bending.

In my pending application above referred to I have shown and described a draft attachment that avoids the difficulties above mentioned by providing for the actual connection of the draw bar with the tractor frame, or corresponding part, at the rear portion thereof, and preferably back of the rear wheels, the draw bar being nevertheless arranged to swing laterally about a virtual pivot or hitch point located a considerable distance forward of the rear wheels and preferably approximately midway between the front and rear wheels. By such arrangement the physical connections between the draw bar and the tractor may be located high enough to give the necessary clearance without regard to the presence of downwardly extending parts of the tractor frame, located at points further forward, which would present obstacles to the free lateral swinging of the draw bar if it were to be actually connected with the tractor frame at such forward hitch point.

My present invention is in the nature of a modification of or improvement upon the structure disclosed in my said application, and it has the same objects in view and is capable of the same uses. It, however, provides a simpler and less expensive construction.

In the accompanying drawings—

Fig. 1 is a plan view, partly broken away, illustrating in full lines the normal position of the draw bar and steering wheels when the tractor is moving straight ahead, and in dotted lines the position of these parts when the tractor is making a left turn;

Fig. 2 is a side elevation, some parts being in section; and

Fig. 3 is an enlarged detail, being a partial longitudinal vertical section on line 3—3 of Fig. 1.

Referring to the drawings,—4 indicates the tractor of which 5 is the rear axle housing, 6 the rear wheels, 7 the front axle, and 8 the front dirigible wheels. The latter wheels are preferably of the automobile type, but any other suitable form of steering wheel mounting may be employed.

Projecting rearwardly from and fixedly secured to the rear portion of the frame of the tractor is a bracket 9, which, in the illustrated construction, is segmental in form and comprises an arcuate bar 10 that extends transversely of the tractor frame at a point back of the rear wheels thereof. This bar is supported by the brackets 9 in symmetrical relation to the tractor frame so that it projects equally at opposite sides of the center line of the tractor, as clearly shown in Fig. 1. Depending from the tractor frame at a point in such center line, and preferably a short distance forward of the rear axle, is a fulcrum pin 11 which intersects the horizontal plane of the plate 10, as shown in Fig. 2. Said pin is preferably fixed, but may be in the form of a link pivoted to the tractor frame to swing fore and aft.

A draw bar 12, which in the present instance is a straight metal bar having a hole 13 or other suitable hitch connection at its rear end, and a short longitudinal slot 14 at its forward end, extends over the bar 10, under the rear portion of the tractor, and is fulcrumed on the pin 11 by threading the slot 14 on said pin. A cotter pin 15, or other suitable device secured to the pin 11 below the forward end of the draw bar 12, holds the draw bar in position on said pin, but permits it to move endwise thereon. The draw bar is therefore free to swing laterally of the tractor along the bar 10 within the range defined by the side portions 9ª of the bracket 9, and if not otherwise supported will bear on said bar. Where the implement or other load connected with the draw bar is such that the point of connection is at a higher level than the bar 10, the draw bar will be normally held out of contact with said bar.

The fulcrum pin 11 is not intended to transmit the draft of the tractor to the draw bar, but is merely a fulcrum or guide for the forward end thereof, that participates in controlling the position of the draw bar when it is swung laterally by steering the tractor toward one side or the other from a straight line of travel. The draft transmitting connection between the tractor and the draw bar is in the form of a crank 16 having an upwardly projecting arm 17 and a downwardly projecting arm 18, as best shown in Figs. 2 and 3. The upwardly extending arm 17 is journaled in a vertically disposed bearing 19 that is fixedly secured to, or is made integral with, the rear portion of the tractor frame in its center line.

The downwardly projecting arm 18 of said crank is journaled in a bearing 20 in the forward portion of the draw bar 12 at a point a short distance back of the slot 14, as best shown in Fig. 3. A cotter pin or other suitable device 21 may be applied to the crank arm 18 below the draw bar 12, to aid in supporting the forward portion of the draw bar, if desired.

It will be noted that the crank 16 extends forward from the bearing 19, under the rear portion of the tractor frame, and obviously may swing laterally about the axis of its vertical arm 17, to carry its depending arm 18 laterally toward one side or the other of the tractor and the fulcrum pin 11. Inasmuch as the crank arm 18 is pivotally connected with the draw bar 12 at a point back of said fulcrum pin, lateral swinging of the crank will cause the draw bar to swing laterally in the same direction, thereby causing the rear end of the draw bar to move through a prolonged arc, as indicated by the dotted lines in Fig. 1. This lateral movement of the draw bar will be accompanied by a slight endwise movement thereof, which is permitted by the slotted connection between the fulcrum pin 11 and the draw bar.

By pivotally mounting the crank 16 on the tractor frame to swing laterally in the manner described, and pivotally connecting it with the draw bar at a point along said bar spaced longitudinally thereof from the fulcrum pin 11, lateral swinging of the crank causes the rear end of the draw bar to swing laterally in a substantially horizontal plane along an arc approximately centered at a point, such as 22, forward of the fulcrum pin 11 and lying in the center line of the tractor.

Preferably the parts are so proportioned, and the pivotal points so located, that such center point, or virtual pivot of the draw bar, is located about midway between the front and rear wheels of the tractor. As the line of draft extends from such virtual pivot point to the center of resistance of the load, and passes through the actual hitch point at the rear end of the draw bar, the construction described provides an effective hitch point that is remote from the actual hitch point, and is located forward of the rear wheels of the tractor, and which may be spaced as nearly centrally between the front and rear wheels as the manufacturer desires.

When the tractor is proceeding straight ahead, the draw bar 12 assumes a position coincident with the center line of the tractor and then the crank 16 also lies in such line.

When, however, the steering wheels are turned to steer the tractor in one direction or the other, the turning of the tractor causes the crank 16 to swing laterally in the direction toward which the steering wheels are turned, which causes the draw bar to swing laterally relatively to the tractor frame to a position of greater or less angularity therewith, depending upon the extent of the turning movement. The line of draft is therefore shifted laterally, swinging about the effective hitch point, as 22, so that the load resistance does not impede the steering of the tractor.

It will be seen, therefore, that by the construction described I avoid the difficulties, and realize the advantages, hereinbefore pointed out. It is to be understood that the term "tractor" as used herein is intended to comprehend not only self-propelled vehicles, but any other form of vehicle used as a draft element to which the load to be hauled may be attached, as my improved construction is applicable for the attachment of various sorts of trailing loads to a leading vehicle or other structure, whether the latter be self-propelled or be itself hauled by some suitable draft power. Furthermore, while I prefer to employ a crank, such as the crank 16, as the draft transmitting means between the tractor and the draw bar, any other equivalent device suitable for the purpose may be employed. The claims hereinafter made are, therefore, to be construed accordingly.

I claim:

1. A draft attachment for tractors comprising a draw bar fulcrumed adjacent to its forward end on the tractor to swing laterally, and a draft transmitting member mounted on the tractor to have its front end swing laterally, and pivotally connected with the draw bar back of its fulcrum point, to transmit draft force thereto, and to swing the same laterally with respect to the tractor.

2. A draft attachment for tractors comprising a draft transmitting member connected with the tractor frame to swing laterally, a draw bar extending longitudinally of the tractor and connected intermediately of its length with said draft transmitting member to swing laterally therewith, and a fulcrum on the tractor frame for the forward portion of the draw bar, said fulcrum being located forward of the point of connection of the draw bar with said draft transmitting member, and of the point of connection of the draft transmitting member with the tractor frame.

3. A draft attachment for tractors comprising a forwardly extending draft transmitting member connected with the tractor frame to swing laterally, a draw bar extending longitudinally of the tractor and connected intermediately of its length with said draft transmitting member to swing laterally therewith, and means on the tractor frame for guiding the forward portion of the draw bar and permitting it to move endwise, said guiding means being located forward of the point of connection of the draw bar with said draft transmitting member, and of the point of connection of the draft transmitting member with the tractor frame.

4. A draft attachment for tractors comprising a draft transmitting member connected with the tractor frame to swing laterally, a draw bar extending longitudinally of the tractor and connected intermediately of its length with said draft transmitting member to swing laterally therewith, said draw bar being capable of vertical movement relative to the tractor, and a fulcrum on the tractor frame having a slotted connection with the forward portion of the draw bar, said fulcrum being located forward of the point of connection of the draw bar with said draft transmitting member, said draft transmitting member being adapted to impart endwise movement to said draw bar relative to its fulcrum point, to increase the radius of the arc which the hitch end of said draw bar describes when it is moved laterally.

5. A draft attachment for tractors comprising a draft transmitting member having its rear portion pivotally connected with the tractor frame to permit its forward end to swing laterally, a draw bar extending longitudinally of the tractor and pivotally connected intermediately of its length with the forward portion of said draft transmitting member to swing laterally therewith, said draw bar having a longitudinal slot in its forward end portion, and a fulcrum pin on the tractor frame engaging in said slot forward of the point of connection of the draw bar with said draft transmitting member.

6. A draft attachment for tractors comprising a crank journaled on the tractor frame to swing laterally and extending forward, a draw bar extending longitudinally of the tractor and pivotally connected intermediately of its length with the forwardly extending portion of said crank to swing laterally therewith, and a fulcrum on the tractor frame for the forward portion of the draw bar, said fulcrum being located forward of the point of connection of the draw bar with said crank.

7. A draft attachment for tractors comprising a crank journaled on the tractor frame to swing laterally and extending forward, a draw bar extending longitudinally of the tractor and pivotally connected intermediately of its length with the forwardly extending portion of said crank to swing laterally therewith, and a fulcrum pin on the tractor frame having slotted connection with the draw bar forward of the point of connection of the draw bar with said crank.

8. The combination with a vehicle, of a draft attachment therefor comprising a draw bar connected with the vehicle at the rear thereof for swinging movement, and a single draft transmitting link having pivotal connection at its rear end with the vehicle to swing laterally, and at its forward end with said draw bar, for controlling the swinging movement of the latter.

9. The combination with a vehicle, of a draft attachment therefor comprising a draw bar, a single draft transmitting link having pivotal connection at its rear end with the vehicle to swing laterally, and at its forward end with said draw bar, for controlling the swinging movement of the latter, and a pivotal guide for the draw bar forward of the point of connection of the draw bar with said link.

10. The combination with a vehicle, of a draft attachment therefor comprising a draw bar, a single draft transmitting link having pivotal connection at its rear end with the vehicle to swing laterally, and at its forward end with said draw bar, for controlling the swinging movement of the latter, and a pivotal guide for the draw bar forward of the point of connection of the draw bar with said link, the draw bar being movable endwise relatively to said guide.

11. A draft attachment for tractors comprising a draw bar fulcrumed adjacent to its forward end on the tractor to swing laterally, and a draft transmitting member mounted on the tractor to swing laterally, and pivotally connected with the draw bar back of its fulcrum point, to transmit all the draft between the tractor and said draw bar for all positions of said draw bar, and to swing the same laterally with respect to the tractor.

12. A draft attachment for vehicles comprising a draw bar fulcrumed adjacent to its forward end on the vehicle to swing laterally and to move endwise relatively thereto, and draft transmitting means interposed between the vehicle and the draw bar, in rear of the fulcrum thereof, to transmit the draft to the vehicle for all positions of the draw bar and guide the draw bar in its lateral movements so that it will swing about a virtual pivot lying forward of the point of actual connection of the draw bar with the vehicle.

13. A hitch connection for tractors comprising a draw bar, and means directly connecting the draw bar with the tractor at two longitudinally spaced points, said means including a forward connection permitting fore and aft movement of the front end of the draw bar with respect to the longitudinal axis of the tractor and a rear connection providing for lateral and rearward relative movement between the rearward portion of the draw bar and the tractor, when the draw bar is swung laterally to either side under the force of the draft.

14. A hitch connection for tractors comprising a draw bar, means providing longitudinally slotted connection between the forward end of the bar and the tractor, whereby the forward end of the draw bar may move endwise with respect to the tractor, and draft transmitting means interposed between the tractor and the draw bar in rear of said slotted connection, said draft transmitting means including a rear laterally shiftable connection between the draw bar and the tractor providing for lateral and rearward movement of the associated portion of the draw bar relative to the tractor when the draw bar swings away from its central position.

15. A hitch connection for tractors comprising a draw bar, and means connecting the draw bar with the tractor at two longitudinally spaced points, said means including a longitudinally shiftable forward connection permitting fore and after movement of the front end of the draw bar with respect to the longitudinal axis of the tractor and a laterally shiftable rear connection providing for lateral and rearward relative movement between the rearward portion of the draw bar and the tractor when the draw bar is swung laterally to either side under the force of the draft.

WILLIAM L. PAUL.

CERTIFICATE OF CORRECTION.

Patent No. 1,852,537.                                   Granted April 5, 1932, to

WILLIAM L. PAUL.

It is hereby certified that error appears in the printed specification of the above numbered patent requiring correction as follows: Page 2, line 114, for the word "he" read the; page 3, line 95, claim 5, for "end" read portion; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.